United States Patent [19]

Gingras

[11] Patent Number: 4,566,269
[45] Date of Patent: Jan. 28, 1986

[54] JET ENGINE REMOVABLE SUPPORT ASSEMBLY

[75] Inventor: Richard E. Gingras, Agawam, Mass.

[73] Assignee: United Technologies Corporation, Hartford, Conn.

[21] Appl. No.: 540,935

[22] Filed: Oct. 11, 1983

[51] Int. Cl.[4] ............................ F02K 3/04; F02C 7/20
[52] U.S. Cl. ..................................... 60/226.1; 60/39.31
[58] Field of Search ................ 60/226.1, 39.31, 39.32, 60/39.83, 39.33, 39.07; 415/122 R

[56] References Cited

U.S. PATENT DOCUMENTS

| | | | |
|---|---|---|---|
| 2,803,943 | 8/1957 | Rainbow | 60/39.31 X |
| 3,269,118 | 8/1966 | Benedict et al. | 60/39.31 |
| 3,543,588 | 12/1970 | Richardson | 60/39.31 X |
| 3,688,560 | 9/1972 | Broman et al. | 60/39.33 X |
| 3,714,779 | 2/1973 | Stein et al. | 60/39.32 X |
| 3,720,060 | 3/1973 | Davies et al. | 60/39.31 X |
| 3,792,586 | 2/1974 | Kasmarik et al. | 60/39.08 X |
| 3,799,476 | 3/1974 | Bouiller et al. | 244/53 R X |
| 3,907,386 | 9/1975 | Kasmarik et al. | 308/173 |
| 4,068,470 | 1/1978 | Sargisson et al. | 60/226.1 |
| 4,288,983 | 9/1981 | O'Rourke, Jr. | 60/226.1 |
| 4,446,461 | 5/1984 | Selleck | 340/870.32 |

FOREIGN PATENT DOCUMENTS 2046810  4/1981  Fed. Rep. of Germany ..... 60/39.33

*Primary Examiner*—Carlton R. Croyle
*Assistant Examiner*—Jeffrey A. Simenauer
*Attorney, Agent, or Firm*—Russell M. Lipes, Jr.

[57] ABSTRACT

A fan jet engine construction in which the drive connection between the rotor drive shaft (10) and the gearbox (18) includes a slideable tower shaft member (26) movable to a first position permitting removal of a drive module (16) and to a second position permitting removal of the fan casing (20) without removal of the gearbox.

6 Claims, 3 Drawing Figures

JET ENGINE REMOVABLE SUPPORT ASSEMBLY

DESCRIPTION

1. Technical Field

This invention relates to a jet engine drive shaft construction and more particularly to a movable tower shaft in a fan jet engine which permits disassembly of certain engine units without removal of other engine units.

2. Background Art

Jet aircraft engines require regular inspection and maintenance in order to assure continued reliable operation. The time required for maintenance is important to a jet aircraft engine operator and, of course, efforts are made to simplify maintenance operations and minimize the time required. These are areas of a jet engine which require more frequent attention than others, and some of these areas are relatively inaccessible and require removal or disassembly of unrelated engine structure so that the area of concern can be inspected and worked on. It is desirable from the maintenance point of view to avoid as much as possible the amount of disassembly and reassembly which must be done in servicing a jet aircraft engine.

I have found that in a fan type jet aircraft engine, a drive assembly which has provision for moving a tower shaft unit in two axial directions permits removal of the tower shaft drive module without removing the gearbox and related plumbing from the fan case and also permits removing the fan case without removing the gearbox.

Kasmarik et al U.S. Pat. No. 3,792,586 shows a support assembly for the power take-off (tower) shaft of a fan type gas turbine engine in which the height of the assembly is varied to enable installation and removal of the assembly from between two engine surfaces. Kasmarik et al U.S. Pat. No. 3,907,386 is directed to similar structure. Bouiller et al U.S. Pat. No. 3,799,476 describes a movable primary shaft having a spherical joint with a jet engine drive shaft to permit assembly and disassembly of the engine from the primary shaft without disassembly of the primary shaft assembly. Richardson U.S. Pat. No. 3,543,588 is directed to an accessory drive for a ducted fan type aircraft engine in which the drive shaft and drive shaft housing are retractable so as to permit removal of the accessory case from the engine.

DISCLOSURE OF INVENTION

An object of the present invention is to provide a fan jet engine construction which permits disassembly and removal of parts for maintenance or replacement with a minimum disturbance of other engine parts.

Another object of the invention is the provision in a fan jet engine of a tower shaft connection which permits disassembly of the shaft drive module and also permits disassembly of the fan case, all without disassembling the gearbox.

A further object of the invention is to provide a tower shaft assembly for a fan jet engine having a connection which permits an upper tower shaft to be movable in a first direction enabling disassembly of the tower shaft drive module and in a second direction enabling disassembly of the fan case with disassembly of a lower tower shaft and gearbox being unnecessary.

The foregoing and other objects, features and advantages will be apparent from the specification and claims from the accompanying drawings which illustrate an embodiment of the invention.

BEST MODE FOR CARRYING OUT THE INVENTION

Figure 1:
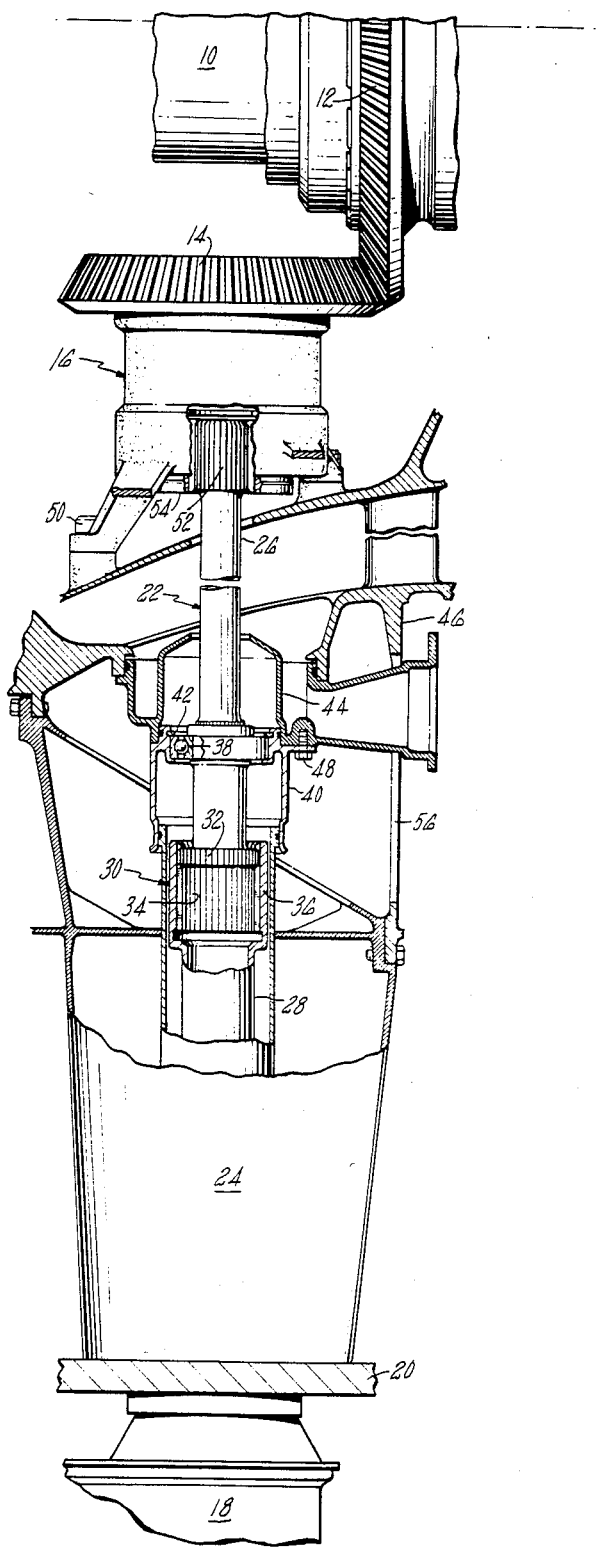
FIG. 1 is a partial sectional view through the intermediate and fan case of a fan jet engine showing a tower shaft construction in accordance with the invention.

Referring to FIG. 1, engine rotor drive shaft 10 through bevel gear 12 mounted thereon and bevel gear 14 in drive module 16 is connected to and drives gearbox 18 attached to the lower outside surface of engine fan case 20 by a gearing and tower shaft assembly 22 extending through support vane 24 in the fan case. It is a construction of the tower shaft assembly permitting servicing of the tower shaft gear drive module and removal of the fan case with a minimum of disassembly of engine parts which is the subject of this invention.

The tower shaft assembly includes upper tower shaft 26 and lower tower shaft 28 which are connected together at splined connection 30, upper tower shaft 26 having external grooves 32 at its lower end mating with internal grooves 34 within cylindrical flange 36 at the upper end of lower tower shaft 28. This juncture of the upper and lower tower shafts is supported by ball bearing 38 which is retained in the upper end of sleeve 40 by snap ring 42. The sleeve is secured to bearing support housing 44 in intermediate casing 46 by a number of bolts, one of which is shown at 48. Drive module 16 is attached to the intermediate casing by a number of bolts, one of which is shown at 50. The upper end of upper tower shaft 26 has external spline grooves 52 which mate with internal spline grooves within shaft 54 of bevel gear 14. The lower end of lower tower shaft 28 is connected to gearbox 18. Access to the tower shaft assembly is provided through port 56 in the intermediate casing.

Figure 2:
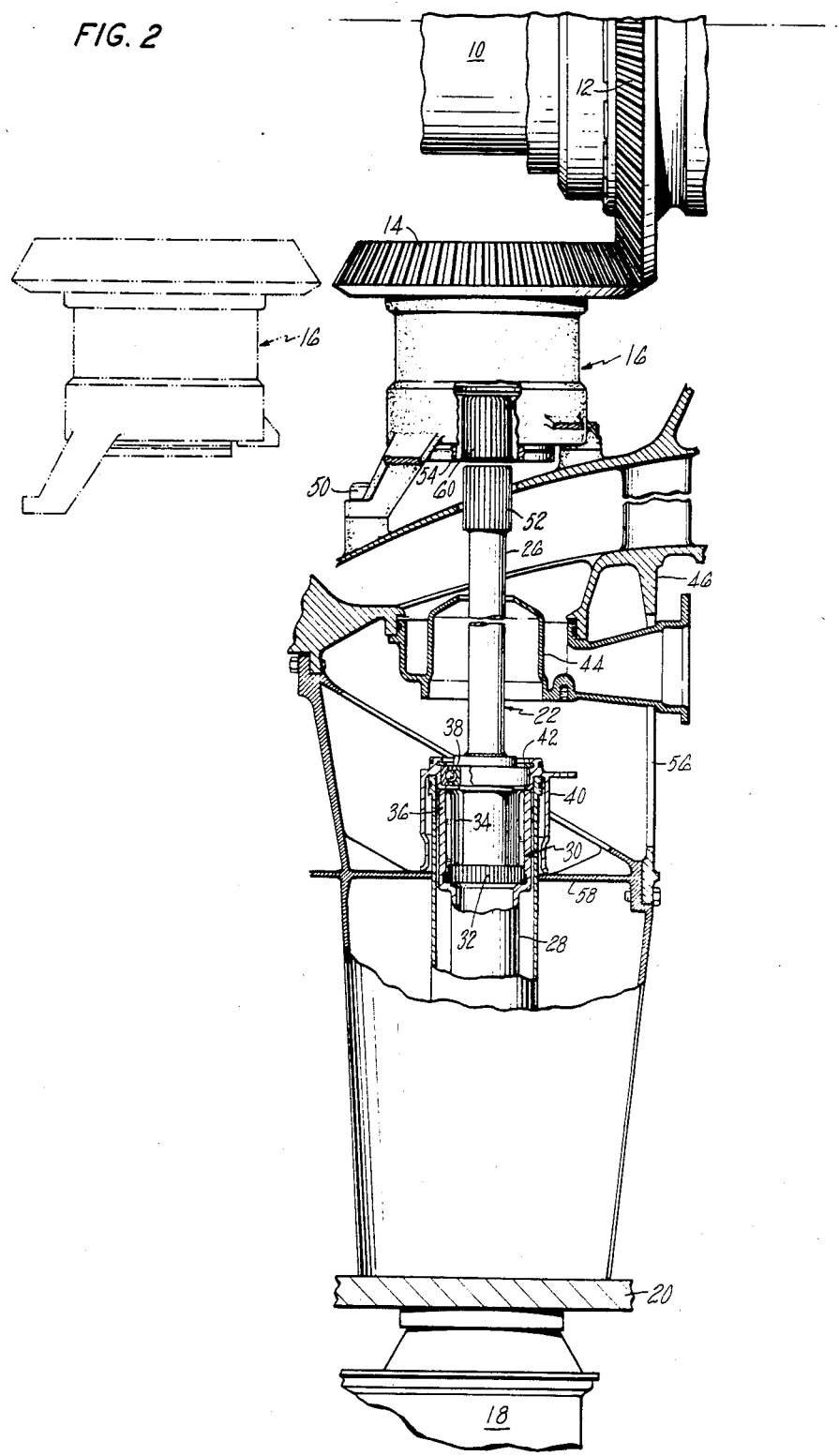
FIG. 2 is a showing of the upper tower shaft in its lowered position, thereby permitting removal of the drive module.

In FIG. 2 the tower shaft assembly is shown in the disassembled position permitting removal of the drive module. Using the access provided by port 56 in intermediate casing 46, bolts 48 (FIG. 1) securing sleeve 40 to bearing support housing 44 have been removed. This allows upper tower shaft 26 and sleeve 40 with retained ball bearing 38 to be moved downward with external grooves 32 on the upper tower shaft sliding along internal grooves 34 within flange 36 on lower tower shaft 28 until sleeve 40 contacts rib 58 within fan case 20. In this position of the upper tower shaft, spline grooves 52 on the upper tower shaft are free of spline grooves 60 within gear shaft 54. Drive module then may be unbolted and removed for inspection, repair or replacement.

Figure 3:
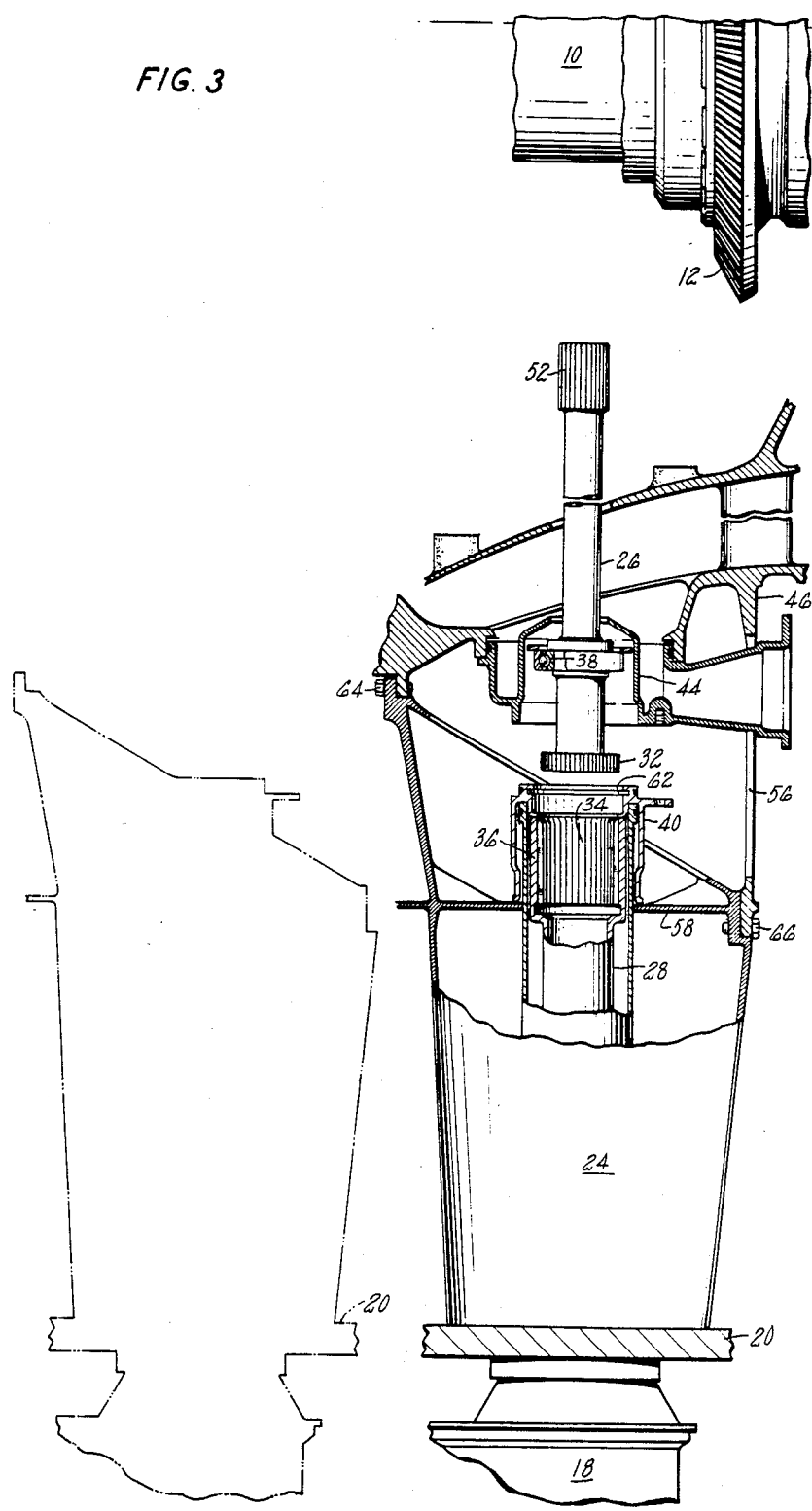
FIG. 3 is a showing of the upper tower shaft in its raised position, thereby permitting removal of the fan case structure.

In FIG. 3 the tower shaft assembly is shown in the disassembled position permitting removal of the fan case. Using the access provided by port 56 in intermediate casing 46, bolts 48 (FIG. 1) securing sleeve 40 to bearing support housing 44 have been removed. This allows the upper tower shaft-sleeve-ball bearing unit to be moved downward until sleeve 40 contacts rib 58.

Snap ring 42 (FIG. 1) then is removed from groove 62 at the upper end of the sleeve. Upper tower shaft 52 with ball bearing 38 is then moved upward until external grooves 32 on the upper tower shaft are free of internal grooves 34 in the lower tower shaft flange 36 and also the upper end of sleeve 40. Bolts 64 and 66 holding fan case 20 to intermediate casing 46 are then removed. The fan case and attached gearbox 18 then can be removed for any required maintenance work.

It should be understood that the invention is not limited to the particular embodiment shown and described herein, but that various changes and modifications may be made without departing from the spirit or scope of this concept as defined by the following claims.

I claim:

1. In a fan jet engine having a fan casing and an intermediate casing, a gearbox attached to said fan casing, a rotor drive shaft and a drive connection for the gearbox extending from the drive shaft through a portion of said fan casing, said drive connection including a tower shaft assembly comprising an upper tower shaft member and a lower tower shaft member, first gear means between said drive shaft and said upper tower shaft, first slideable connecting means between said first gear means and said upper tower shaft, second slideable connecting means between said upper and lower tower shafts, means surrounding said upper tower shaft and attached to said intermediate casing for supporting and axially locating said upper tower shaft in a normal operating position, means for detaching said surrounding means from said intermediate casing so that said upper tower shaft can be moved axially to a first position free of connection with said first gear means, and means for detaching said upper tower shaft from said surrounding means so that said upper tower shaft can be moved axially to a second position free of connection with said lower tower shaft.

2. A drive connection for a fan jet engine in accordance with claim 1 in which the surrounding means for the upper tower shaft includes a bearing and bearing retention means.

3. A drive connection for a fan jet engine in accordance with claim 1 in which the first and second slideable connection means are splines.

4. A drive connection for a fan jet engine in accordance with claim 1 in which axial movement of said upper tower shaft to said first position is in the opposite direction to axial movement of the tower shaft to said second position.

5. A drive connection for a fan jet engine in accordance with claim 1 in which said first slideable connecting means includes an internally splined shaft in said first gear means and said second slideable connecting means includes an internally splined flange in said lower tower shaft for connection with said upper tower shaft and for permitting axial movement of said upper tower shaft.

6. A drive connection for a fan jet engine in accordance with claim 5 in which said upper tower shaft has an external spline at its upper end for connection with said first gear means and an external spline at its lower end for connection with said lower tower shaft.

* * * * *